July 19, 1927.
L. WILLIAMS
1,636,267
COMBINED ROTARY BEVEL SHEAR AND SCRAP CUTTER
Filed Nov. 30, 1925
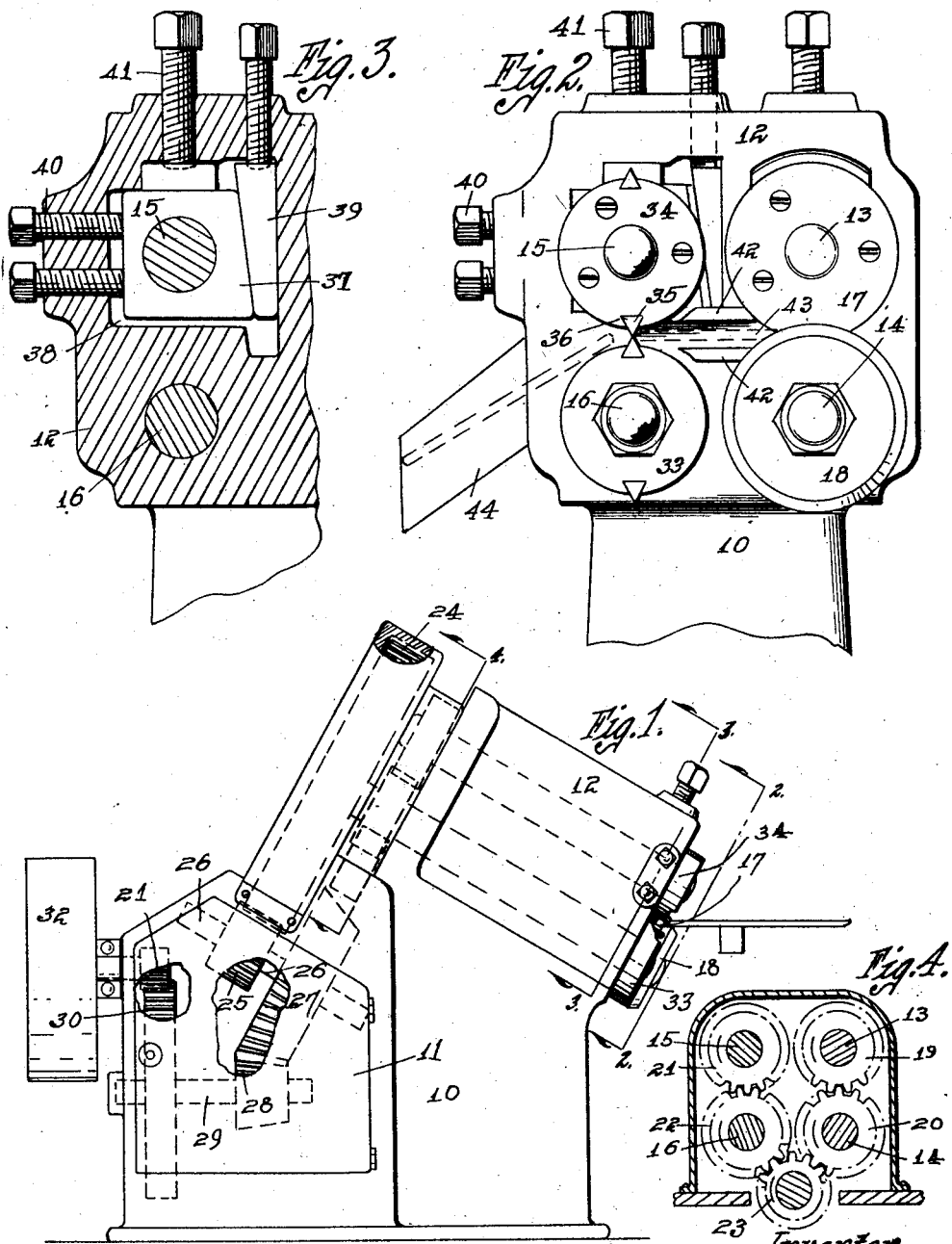
Inventor
Lester Williams
by Orving E Hague, Attys.

Patented July 19, 1927.

1,636,267

UNITED STATES PATENT OFFICE.

LESTER WILLIAMS, OF MARSHALLTOWN, IOWA.

COMBINED ROTARY BEVEL SHEAR AND SCRAP CUTTER.

Application filed November 30, 1925. Serial No. 72,378.

This invention relates to improvements in that type of mechanism used to bevel the edges of sheet metal plates, and more particularly to disposing of the scrap which has been removed from the plate, which is triangular in shape in cross section and sometimes of a considerable length, the said scrap usually curling and twisting as it leaves the machines, and it is inconvenient and dangerous to handle on account of its stiffness and its sharp and rough edges.

It is, therefore, the object of my invention to provide means in connection with the rotary shears of the bevel cutting machine means whereby a strip of scrap material may be automatically cut into short lengths, which may be automatically delivered to a suitable container, and thereby obviate the danger usually experienced in handling this scrap, as well as placing the scrap in a convenient condition for transportation so it may be remelted and used again.

A further object of my invention is to provide a scrap cutting mechanism which is formed integral with, and made a part of, the bevel cutting mechanism.

A further object is to provide in a scrap cutter having rotary chopping members, detachable cutting elements which may be easily quickly removed when so desired, said elements being formed triangular in cross section so they may present three cutting edges, which are so mounted that either one of the edges of one of the cutting members may be easily and quickly brought into operative relation with its coacting cutting member.

A further object is to provide in a scrap cutter having rotary chopping members improved means for alining the chopping members of one rotary cutter with its coacting chopping member.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved mechanism.

Figure 2 is an end elevation taken on the line 2—2 of Figure 1.

Figure 3 is a detail sectional view taken on the line 3—3 of Figure 1.

Figure 4 is a detail sectional view taken on the line 4—4 of Figure 1.

My improved device comprises a supporting frame 10 having a gear compartment 11 and a bearing member 12, said bearing member being provided with a pair of inclined shafts 13 or 14, and also a pair of inclined shafts 15 and 16, all of said shafts being parallel with each other. The shaft 13 has at its lower end a cutter member 17, while the shaft 14 is provided with a cutter member 18, said cutter members 17 and 18 forming what I shall term the rotary bevel shears which are of common construction. The shaft 13 is provided at its upper end with a spur gear 19 which is in mesh with a spur gear 20 mounted on the shaft 14, while the upper end of the shaft 15 is provided with a gear 21 in mesh with a gear 22 on the shaft 16. The gears 20 and 22 are in mesh with an idler pinion 23 so that all of said gears may be operated in unison. The shaft 14 is driven through a gear 24 which in turn is driven through a pinion 25 mounted on a stub shaft 26, the shaft 26 being provided with a bevel gear 27 in mesh with a smaller bevel gear 28 driven from the shaft 29, which in turn is driven by means of the gear 30. The said gear 30 is driven by the pinion 31 from the belt wheel 32.

The outer end of the shaft 16 is provided with a disk 33, while the outer end of the shaft 15 is provided with a disk 34, each of said disks having at its periphery a pair of transversely arranged, diametrically opposite, triangularly shaped grooves 35, each of said grooves being designed to receive a cutting tool which is triangular in cross section, said tools being inserted by being driven endways into said grooves. The disks 33 and 34 are so positioned on their respective shafts that one of the cutters 36 of one disk will be in alinement with an adjacent cutter when the said cutters are in a common plane with the center of the shafts 15 and 16. The outer end of the shaft 15 is mounted in a bearing block 37 which is placed in a suitable recess 38 in the member 12, so that the outer end of the shaft 15 may be adjusted toward and from the shaft 16, or it may be adjusted laterally with the first said adjustment, the lateral adjustment being controlled by a wedge 39 and set screws 40, while the vertical adjustment of said block is controlled by a set screw 41.

The vertical adjustment is to provide means for bringing the cutting edges of the coacting cutting members 36 into engagement with each other, while the lateral adjustment of the block 37 is to provide for bringing the coacting cutting members into proper alinement with each other laterally to take care of any back lash between the gears 21 and 22.

Guide members 42 project outwardly from the end of the member 12 to form a groove 43 for receiving the strip of scrap from the cutters 17 and 18, said scrap being indicated by dotted lines in Figure 2. The disks 33 and 34 are alined with the cutters 17 and 18 in such a manner that said scrap will pass between the said disks and be engaged by the cutter members 36. The said cutter members and said disks are driven from the gears 21, 22 and 23.

Thus it will be seen that I have provided means whereby a scrap of material, which is being continuously fed from the cutters 17 and 18, will automatically enter between the periphery of the disks 33 and 34 and be automatically engaged and severed by the members 36 into short lengths, which may then be delivered to a suitable trough 44, thereby providing means for easily and quickly disposing of a dangerous and undesirable scrap of sheet metal, which is formed in connection with the bevel cutting shears and made to operate therewith as a single unit.

It will further be seen that I have provided rotary scrap cutting members having detachable cutters, each of which has a number of sharp edges, any one of which may be easily and quickly brought into operative position.

I claim as my invention:

1. In a device of the class described, the combination of a frame, two parallel rotatable shafts mounted in the frame, a gear wheel fixed to each shaft, said gear wheels being in mesh with each other, a disk fixed to each shaft, said disks being slightly spaced apart from each other, a cutter member in each disk, said cutter members being so arranged that as the disks are rotated they will come together during each revolution of the disks for cutting off a piece of scrap inserted between them, an adjustable bearing for one of said shafts capable of adjusting said shaft laterally with respect to the other shaft, and whereby the cutting member carried by the adjustable shaft may be advanced or retarded relative to the cutter carried by the other shaft, so that the cutting members may be made to accurately register relative to each other without disturbing the fixed connection between the disk and shaft.

2. In a device of the class described, the combination of a frame, two parallel rotatable shafts mounted in the frame, a gear wheel fixed to each shaft, said gear wheels being in mesh with each other, a disk fixed to each shaft, said disks being slightly spaced apart from each other, a cutter member in each disk, said cutter members being so arranged that as the disks are rotated they will come together during each revolution of the disks for cutting off a piece of scrap inserted between them, an adjustable bearing for one of said shafts capable of adjusting said shaft laterally with respect to the other shaft, and whereby the cutting member carried by the adjustable shaft may be advanced or retarded relative to the cutter carried by the other shaft, so that the cutting members may be made to accurately register relative to each other without disturbing the fixed connection between the disk and shaft, said adjustable bearing device comprising a bearing block for the shaft, a substantially horizontally arranged set screw mounted in the frame to engage said bearing block, a wedge mounted in the frame to engage the bearing block on the side opposite from said set screw, a set screw mounted in the frame to engage said wedge, and a set screw mounted in the frame to limit the upward movement of the bearing block.

3. In a device of the class described, the combination of two parallel shafts, means for gearing them together to rotate in unison, a disk fixed to each shaft, said disks being slightly spaced apart, each disk being provided with a substantially triangular groove in its periphery parallel with the shaft, and a substantially triangular cutter mounted in each groove, the cutting edges thereof being arranged to substantially engage each other during the rotation of the disks, said cutters being substantially triangular in cross section and being detachably mounted in the grooves whereby they may be removed when the cutting edges have become dull and again reinserted in the groove with the worn cutting edge in the groove and a sharpened cutting edge projecting from the disk.

LESTER WILLIAMS.